Figure 1:
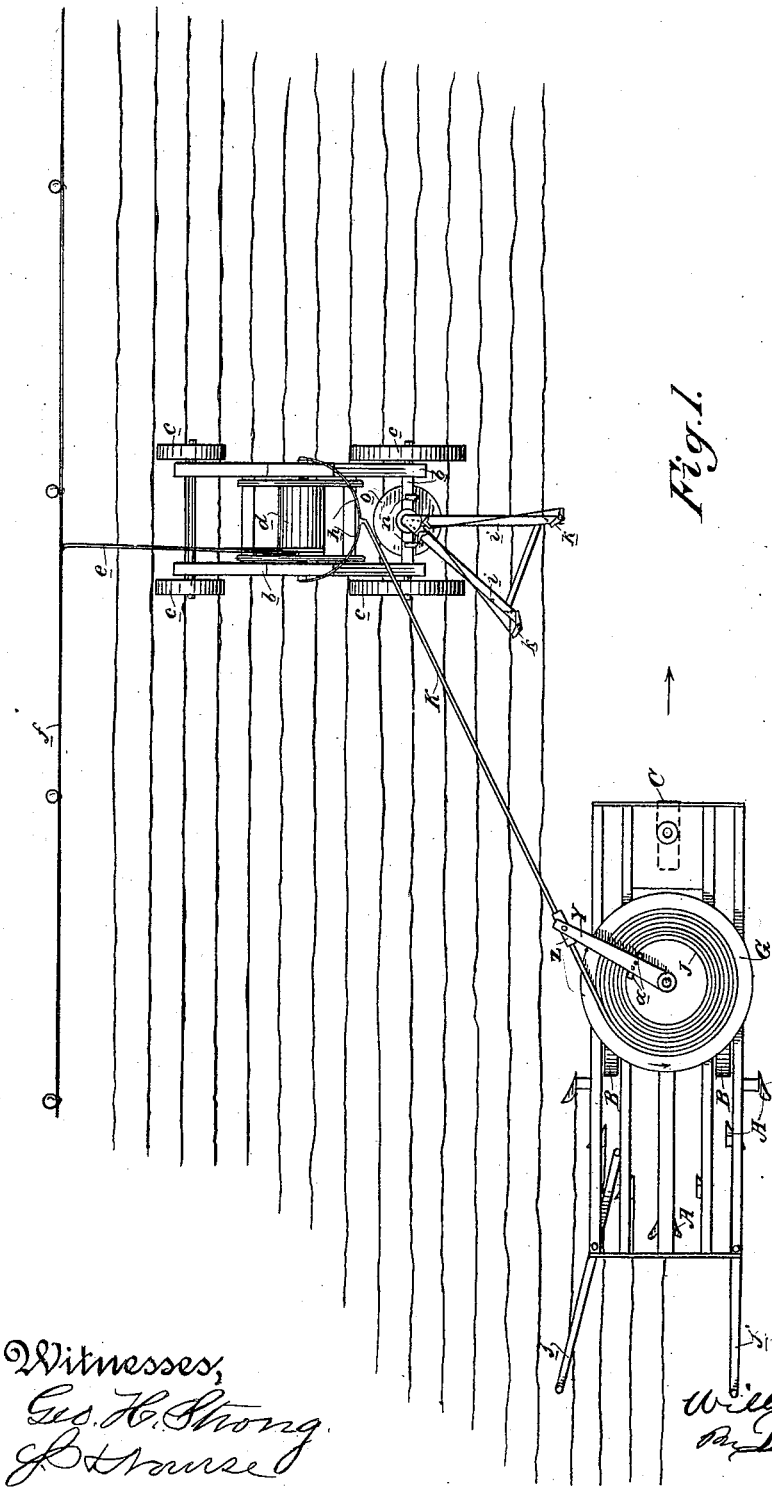

(No Model.) 4 Sheets—Sheet 1.
W. STEPHENS.
ELECTRICAL TRACTION APPARATUS.

No. 435,983. Patented Sept. 9, 1890.

Witnesses,
Geo. H. Strong.
J. H. Krouse

Inventor,
William Stephens
By Dewey & Co.
Attys (No Model.) 4 Sheets—Sheet 2.
W. STEPHENS.
ELECTRICAL TRACTION APPARATUS.
No. 435,983. Patented Sept. 9, 1890.
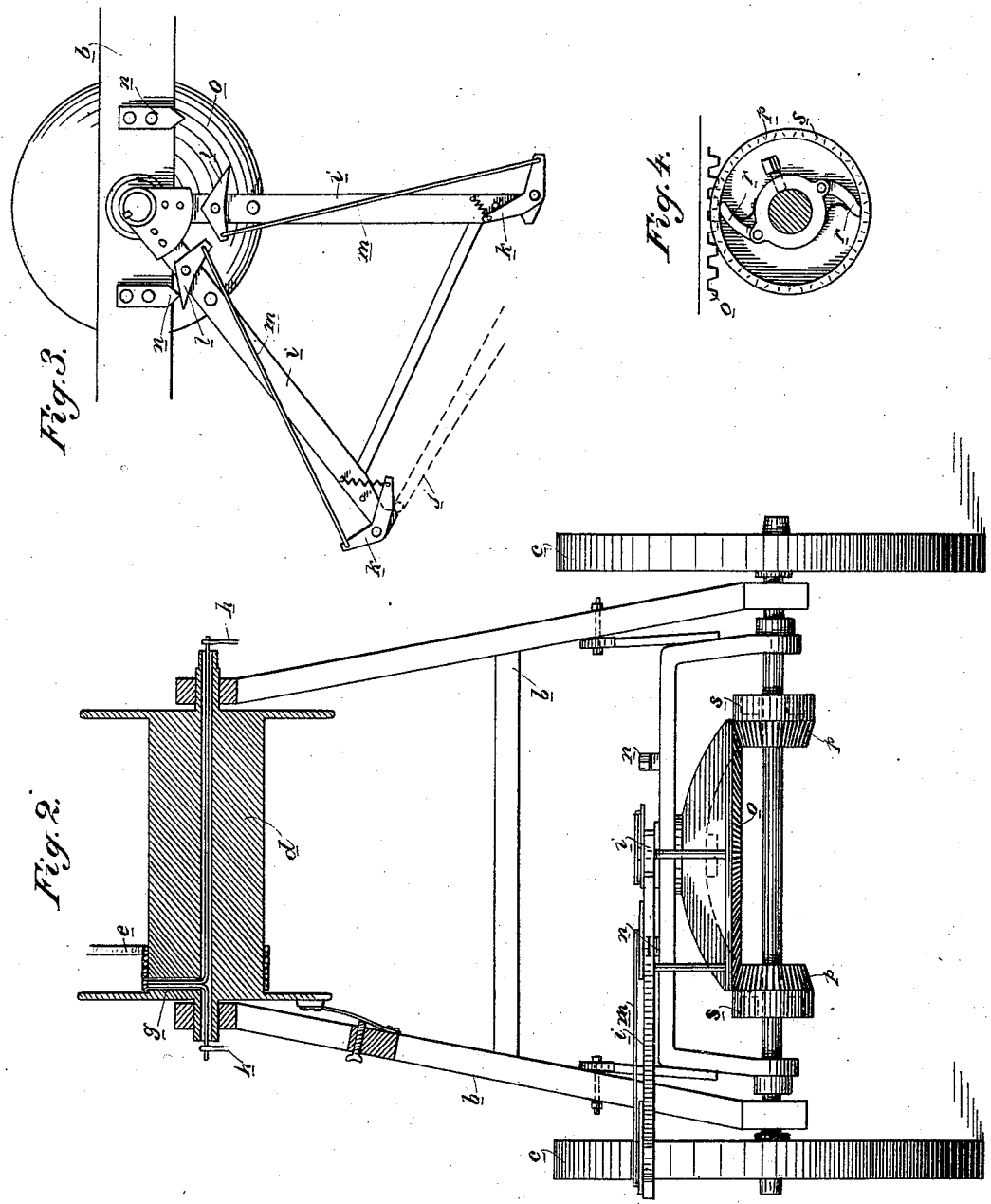
Witnesses,
Geo. H. Strong
Inventor,
William Stephens
By Dewey & Co.
attys (No Model.) 4 Sheets—Sheet 3.
W. STEPHENS.
ELECTRICAL TRACTION APPARATUS.
No. 435,983. Patented Sept. 9, 1890.
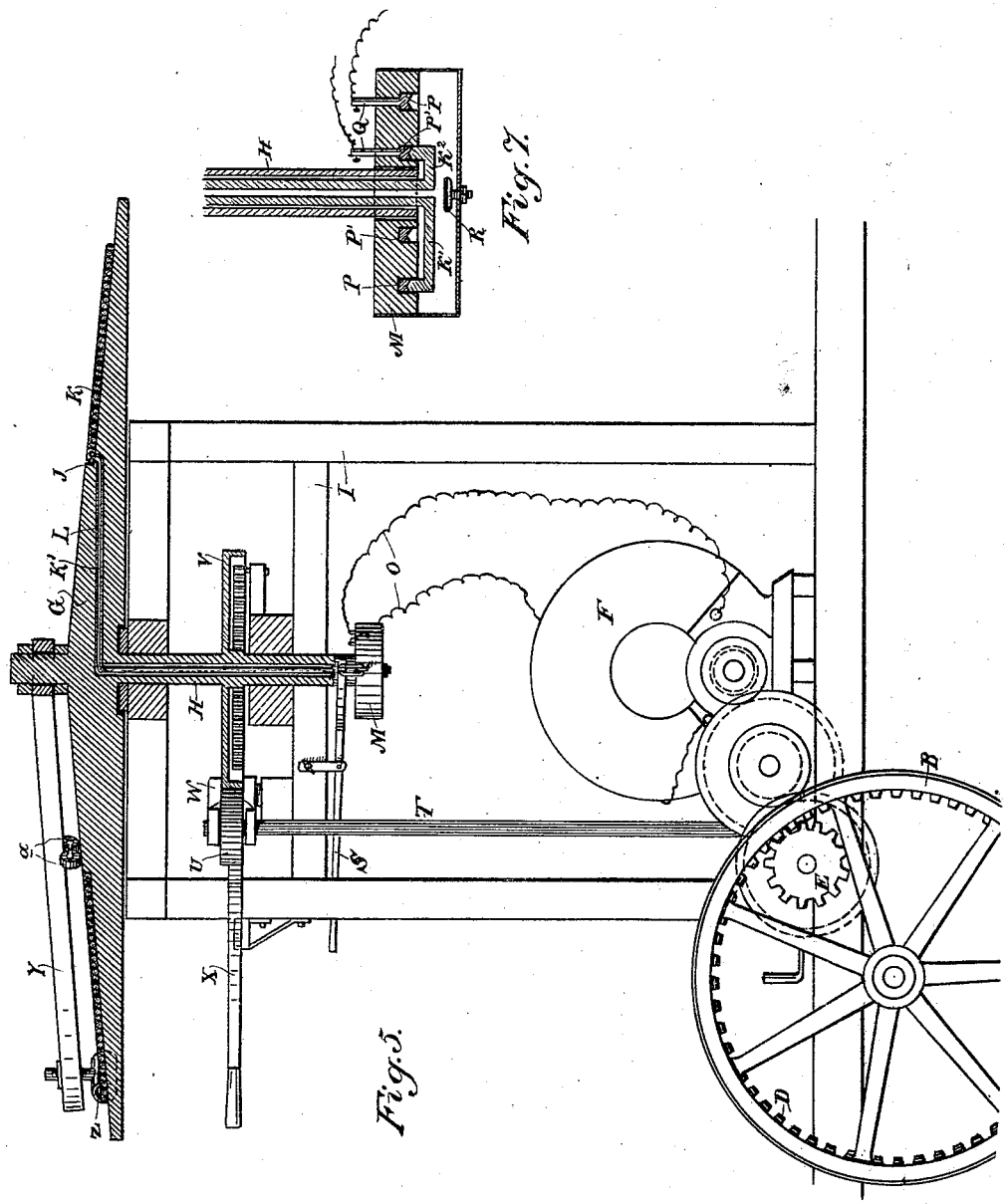

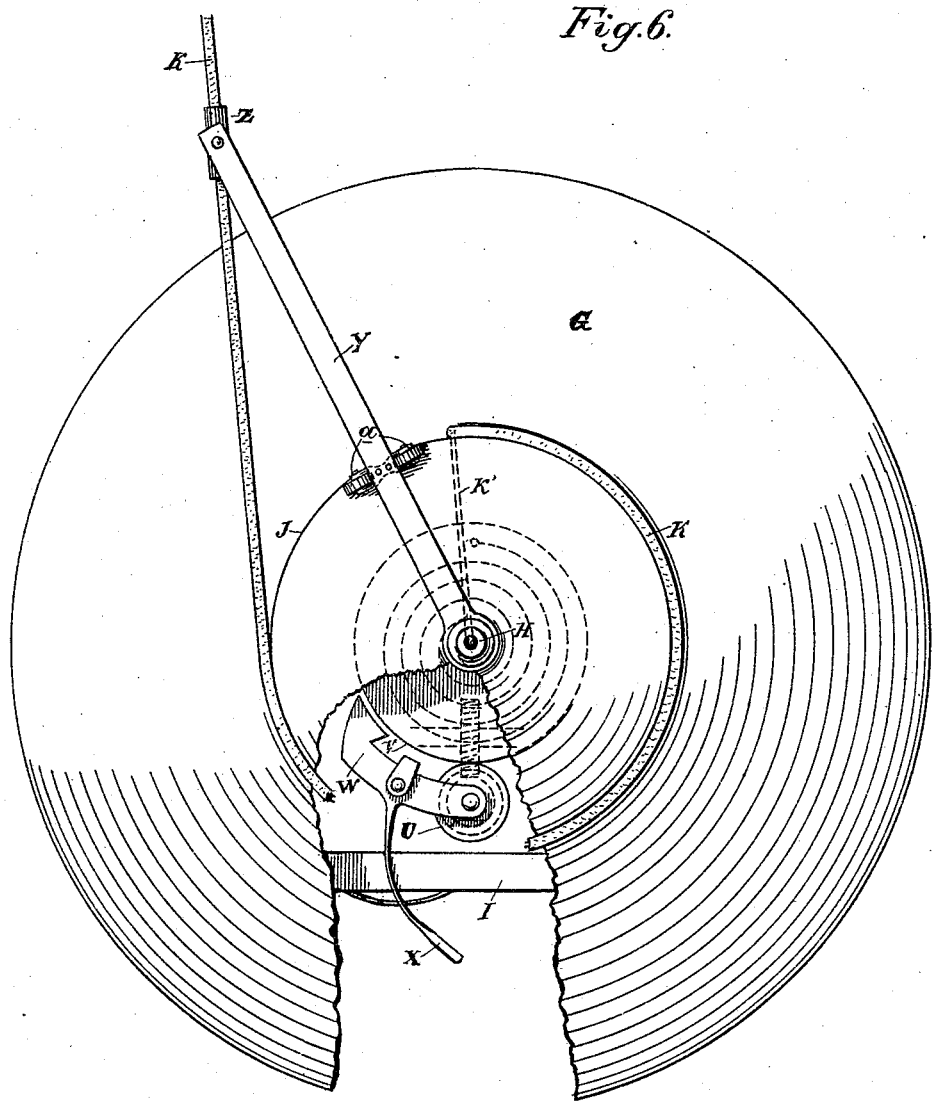

UNITED STATES PATENT OFFICE.

WILLIAM STEPHENS, OF SANTA ROSA, CALIFORNIA.

ELECTRICAL TRACTION APPARATUS.

SPECIFICATION forming part of Letters Patent No. 435,983, dated September 9, 1890.

Application filed March 21, 1890. Serial No. 344,805. (No model.)

*To all whom it may concern:*

Be it known that I, WILLIAM STEPHENS, a citizen of the United States, residing at Santa Rosa, Sonoma county, State of California, have invented an Improvement in Electrical Traction Apparatus; and I hereby declare the following to be a full, clear, and exact description of the same.

My invention relates to an apparatus which I term an "electrical traction apparatus." It is especially useful for propelling plows or harvesting-machines by means of a motor and intermediate connections whereby said motor may be kept constantly connected with a stationary source from which the electrical energy is supplied to the motor, while the motor and machinery are allowed to travel to various distances from the source of supply without destroying the connection.

Referring to the accompanying drawings for a more complete explanation of my invention, Figure 1 is a plan view showing the general arrangement of the machinery. Fig. 2 is an enlarged view of the carriage, the reel upon which the conductor is coiled, and a means for advancing the carriage at right angles with the traveling machine. Fig. 3 is a plan view showing a part of the advancing mechanism. Fig. 4 is a view of the clutch. Fig. 5 is a vertical section of the reel upon which the conductor is coiled and uncoiled upon the traveling machine and connected mechanism. Fig. 6 is a plan view of the reel with a part broken away. Fig. 7 is a vertical section of the disk M.

In order to illustrate the operation of my apparatus, I have here shown it as connected with a gang of plows A, mounted upon a frame, which is supported upon bearing-wheels B and a steering-wheel C. The bearing-wheels B have toothed gears D fixed inside their periphery, and these are engaged by pinions E upon a horizontal driving-shaft, which has motion communicated to it through any suitable or well-known intermediate gearing by which the proper rate of speed may be maintained from a motor F, which furnishes power to drive the machinery. In order to supply the electrical current to this motor from a stationary dynamo, or from wires which are brought to some point from the dynamo, I have shown a mechanism by which a conductor of varying length may be employed between the source of supply and the traveling machine and means by which the proper tension is kept upon said conductor and it is allowed to wind and unwind as the traveling machine approaches the stationary source of supply or recedes from it.

G is a flat disk mounted upon a vertical shaft H, which is supported upon a framework I above the traveling machine. The upper surface of this disk is made in the form of a very flat cone, as shown, and it has an annular raised portion around the center, which forms a shoulder at J.

The conductor is in the form of a flat belt K of any suitable construction and containing the two conducting-wires, which lead from the source of electrical supply to the traveling machine through an intermediate stationary apparatus, which will be hereinafter described. This flat belt is coiled upon the disk G, commencing at the shoulder J, and as the machine approaches the stationary apparatus from which the conductor is led to it the conductor is coiled upon the disk, the latter being suitably rotated for that purpose, and the conductor is thus coiled up as fast as the machine approaches the stationary apparatus, and when the machine has passed the stationary apparatus it uncoils in the same manner, so as to allow the machine to recede to any distance to which it is desired to have it travel, while the current of electricity is constantly supplied to the motor F, by which the machine is driven.

The two conducting-wires are led from the inner end of the conductor K' through an opening L, which is made in the central portion of the disk G, and thence through the vertical hollow shaft H to a point below the disk M, where connection is made with the wires O O, leading to the motor F, in the following manner: P P are metallic conducting-rings, which are let into the bottom of the non-conducting disk M, and the two conducting-wires, which pass down through the hollow shaft H, are bent, as shown at K' K² in Fig. 7, so that their upturned ends are in constant contact with the rings P and P'. It will be seen that as the disk and shaft revolve these conductors are carried around with them and travel in contact with the rings P and P′. From these rings two binding-posts Q project upward through the disk M, and the wires O are taken out from these binding-posts and led thence to the motor. Whenever it is desired to stop the machine the current is short-circuited by means of a vertically-moving metallic plate or disk R, which is adapted to be raised by means of a lever S, which brings it into contact with the conductors K′ K² beneath the disk M, and thus makes a direct circuit while the machine is out of action. The shaft H and disk G are rotated from the mechanism or gearing intermediate between the motor F and the driving-wheels B by any suitable connection acting through a vertical shaft T, having a friction-wheel U at the upper end, which engages with the corresponding frictional rim of the wheel V, secured to the shaft H. By this means the disk G will be rotated with sufficient power to coil up the conductor K when the machine is approaching the point from which the conductor leads; but it will also be allowed to slip or run freely, so that the conductor may uncoil when the machine is receding from this point.

W is a brake, which may be thrown into contact with the rim V to check or steady the motion of the disk G, and this brake is operated by a lever X, as shown in Fig. 6.

In order to hold the conductor K in proper relation to the disk G, so that it will coil and uncoil regularly, I have shown the arm Y centrally swiveled upon a stem projecting from the center of the disk G and carrying the guide-sleeve Z at its outer end, through which the conductor K passes and by which it is led regularly in spirals around upon the upper surface of the disk.

$a\ a$ are rollers journaled upon the arm Y and adapted to travel upon the inner portion of the disk G, just within the periphery of the vertical shoulder J, and these support the arm Y, and with its central loose pivot allow it to turn in any direction as the relative position of the machine to the stationary point is changed.

The stationary mechanism through which the conductor K passes consists of a framework $b$, mounted upon the supporting-wheels $c$ and having journaled in the upper end of the frame the drum $d$, around which a conductor $e$ is coiled. This conductor extends from the main source of supply, (which in the present case is represented by the wires $f$, leading from the dynamo to a convenient point in the field,) and the conductor $e$ leads from these wires to the drum $d$, around which it is coiled. Through this drum is made an opening $g$, through which the two parts of the conductor-wires $e$ are led to the center, and thence they separate, passing to each end of the axle or shaft of the drum $d$, and are there connected with the conducting-arms $h$, which are shown in Fig. 1 in the form of an arc or bail meeting in the center, from which the conductor K leads to the disk G, as before described. This apparatus which carries the drum $d$ is set at any point in the field at right angles with the direction of travel of the traveling machine or plows A and just to one side of the line of travel. It is necessary to advance this machine toward the line of travel of the plows A at each passage of the plows across the field, and this is effected automatically by means of the levers $i$, which project from the front of the machine $b$ in such a manner as to be engaged by a lever-arm $j$ upon the traveling machine A. Whenever this machine passes the stationary one $b$ the end of the lever-arm $j$ is turned up, so as to form a sort of hook, which engages a projecting latch $k$ upon one of the arms $i$, as shown in Fig. 3, and this operates to move the lever-arms $i$ about their common center or vertical shaft and until they reach a point where the hook-arm is disengaged. This disengagement is effected by means of the swivel-plates $l$, pivoted to the inner ends of the arms $i$ and connected with the latches $k$ by the rods $m$. Upon the stationary part of the frame are fixed the two projections $n$ in such position that when the arms $i$ have been turned as far as is desired by the passing arm $j$, one of the plates $l$ will engage with its corresponding projecting plate $n$ and will thus turn the latch $k$, so as to disengage the frame and allow the machine A to pass on. This movement of the arms $i$ is communicated through the vertical shaft to which they are attached to a beveled gear $o$, and through it to the beveled pinions $p$, which are fixed upon an axle of the wheel $c$, and through this mechanism these wheels are rotated and cause the intermediate machine $b$ to be advanced a distance equal to the width of the furrows which have been plowed at each passage of the plows across the field, or in case of a traveling harvester the movement would be equal to the width of the cut made by the harvester. It will be manifest that only one of the pinions $p$ can be acted upon by the gear-wheel O at one time, and consequently the other one must be allowed to turn loosely upon the shaft while this one is connecting. This result is effected by means of any well-known relief or compensating gearing. In the present case I have shown a device in Fig. 4, consisting of the spring-actuated arms $r$, which have their inner ends fulcrumed to a collar upon the shaft of the driving-wheel $c$, and the outer ends are adapted to engage the inner periphery of a drum $s$ at such an angle as to produce a frictional contact sufficient to rotate said drum, and with it the pinion $p$, to which it is attached, in one direction; but when turned in the other direction the pinion will move freely and not act upon the shaft or axle.

Having thus described my invention, what I claim as new, and desire to secure by Letters Patent, is—

1. The traction apparatus having the bearing and driving wheels, intermediate gearing, and motor, the flexible conducting-belt with a means for coiling and uncoiling the same upon the machine, the conductors leading from said belt through the central vertical shaft of the disk and having the upturned ends, a disk fixed to the lower end of said shaft and having the annular metallic rings with which the upturned ends of the conductors form a contact and through which communication is made with the motor, and the disk or plate R, movable so as to connect the conductors and short-circuit the current, substantially as herein described.

2. An electrical traction apparatus having the bearing and driving wheels, motor, and the winding drum or disk, as shown, in combination with the independent stationary frame-work $b$, a drum journaled upon said frame-work and having the conductors $e$ coiled upon said drum, connections made through the central shaft of said drum between said conductors and the exterior arms $h$, and the flexible conductor K, leading from the arms $h$ to the winding drum or disk upon a movable traction apparatus, substantially as herein described.

3. The electrical traction apparatus with its driving-wheels, intermediate gearing, and motor, a drum $d$, mounted upon an independent frame-work and bearing-wheels, a conductor leading from the traveling machine to said drum, and a second conductor coiled upon said drum and leading therefrom to the stationary source of supply, in combination with the mechanism whereby the frame-work carrying the drum $d$ may be intermittently advanced at right angles with the line of travel of the machine, substantially as herein described.

4. The electrical traction-machine with a motor whereby it is caused to travel from end to end of the field, an intermittently-moving apparatus through which a current of electricity is transmitted by means of flexible conductors to the traction apparatus, and a mechanism for advancing this intermittent machine at right angles with the line of travel of the traction apparatus, consisting of the levers $i$, adapted to swing from side to side about a vertical axis, gears connected with said vertical shaft and engaging pinions upon the axle of the bearing-wheels, latches fixed to the ends of the arms $i$, and an arm projecting from the traction apparatus and adapted to engage said latches and swing the levers when the apparatus passes the intermediate machine, substantially as herein described, 5. The electrical traction apparatus with its driving-wheels, intermediate gearing and motor, a drum $d$, mounted upon an independent frame-work and bearing-wheels, a conductor leading from the traveling machine to the drum, and a second conductor coiled upon said drum and leading therefrom to a stationary source of supply, in combination with mechanism for advancing the support carrying the drum $d$, consisting of the oscillating lever-arms $i$ and gears $o$ $p$, whereby power is transmitted from the shaft of the oscillating arms to the axles of the wheels $c$, substantially as herein described.

6. The electrical traction-machine with a motor whereby it is caused to travel from end to end of the field, an intermittently-moving apparatus through which a current of electricity is transmitted by means of flexible conductors to the traction apparatus, a mechanism for advancing this intermittent machine at right angles with the line of travel of the traction apparatus, consisting of the levers $i$, adapted to swing from side to side about a vertical shaft, gears connected with said vertical shaft and engaging pinions upon the axle of the bearing-wheels, latches fixed to the ends of the arms $i$, and an arm projecting from the traction apparatus and adapted to engage said latches and swing the levers when the apparatus passes the intermediate machine, together with the plates $l$, connecting-rods $m$, and the disengaging lugs or plates $n$, substantially as herein described.

In witness whereof I have hereunto set my hand.

WILLIAM STEPHENS.

Witnesses:
J. P. OVERTON,
C. A. HOFFER.